United States Patent Office 3,510,518
Patented May 5, 1970

3,510,518
PREPARATION OF N,N'-DIARYL-p-PHENYLENEDIAMINES
Alexander Gaydasch, Chicago, Ill., assignor to Universal Oil Products Company, Des Plaines, Ill., a corporation of Delaware
No Drawing. Filed July 26, 1966, Ser. No. 567,817
Int. Cl. C07c 87/50
U.S. Cl. 260—576                                                4 Claims

ABSTRACT OF THE DISCLOSURE

N,N'-diaryl-p-phenylenediamines are prepared by condensing an aromatic amine with a polyhydroxy aromatic compound in the presence of a catalyst comprising one or more oxides of Mo, Ni and/or rare earths composited on a silica-alumina support.

---

This invention relates to a process for preparing compounds which possess antiozonant properties. More particularly, the invention is concerned with a process whereby improved yields of compounds comprising N,N'-diaryl-p-phenylenediamines which possess excellent antiozonant properties may be obtained thereby.

Many and varied organic materials are subject to oxidative deterioration, such materials including motor fuel, particularly unsaturated gasolines as, for example, cracked gasoline and polymer gasoline, diesel oil, mineral oil, lubricating oil, fuel oil, drying oil, greases, rubber, monomers such as styrene, butadiene, paraffin waxes, edible fats and oils.

Among the edible fats and oils which may be of animal or vegetable origin and which tend to become rancid especially during long periods of storage prior to use, include linseed oil, cod liver oil, castor oil, olive oil, peanut oil, coconut oil, corn oil, butter, fat, lard, beef tallow, as well as the hydrogenated oils. It is to be understood that other oils and fats may be treated with compounds prepared according to the process of the present invention including such oils and fats which may have been preferably subjected to various treatments such as blowing with air or steam, and heat treatment.

These materials are adversely effected by oxygen or, in some instances, ozone with the resultant formation of undesirable gums in the case of oils, discoloration or rancidity in the case of the edible fats and oils or cracking in the case of rubber as well as other deleterious reactions. Therefore, certain substances must be added to the aforementioned organic materials which act to stabilize such materials and thus delay or prevent the undesired reactions from occurring.

Among these compounds which possess antioxidant or antiozonant properties are those compounds possessing a p-phenylenediamine base in which the two nitrogen atoms contain certain substituents. These substituents may be of an alkyl or aryl nature, among which it is known that N,N'-diaryl-p-phenylenediamine compounds possess excellent antioxidant and antiozonant properties.

It is therefore an object of this invention to provide a process for preparing N,N'-diaryl-p-phenylenediamine.

Another object of this invention is to provide a process whereby N,N'-diaryl-p-phenylenediamines may be obtained in greater yields by use of certain catalytic compositions of matter.

In one aspect, an embodiment of this invention is found in a process for the preparation of N,N'-diaryl-p-phenylenediamines which comprises condensing at least one aromatic amine with an aromatic compound containing at least one hydroxyl substituent in the presence of a solid catalyst, which contains at least one metal oxide, and recovering the resultant N,N'-diaryl-p-phenylenediamines.

A specific embodiment of this invention is found in a process for the preparation of N,N'-diaryl-p-phenylenediamines which comprises condensing aniline, o-toluidine and hydroquinone in the presence of a catalyst comprising molybdenum oxide and nickel oxide composited on a silica-alumina support at a temperature in the range of from about 100° to about 400° C. and a pressure in the range of from about atmospheric to about 50 atmospheres, and recovering the resultant N,N'-di-o-toluyl-p-phenylenediamine, N - phenyl - N'-o-toluyl-p-phenylenediamine and N,N'-diphenyl-p-phenylenediamine.

Other objects and embodiments will be found in the following further detailed description of this invention.

As hereinbefore set forth, the present invention is concerned with an improvement in a process for obtaining N,N'-diaryl-p-phenylenediamines utilizing certain catalytic compositions of matter to effect the condensation of the reactants hereinafter set forth in greater detail. The term "diaryl" as used in the present application will refer to both N-phenyl and substituted N-phenyl alkyl compounds. The desired product is obtained by condensing at least one aromatic amine with an aromatic compound containing at least one hydroxyl substituent in the presence of certain catalytic compositions of matter of the type hereinafter set forth in greater detail. By utilizing these catalysts, it is possible to obtain the desired product in a greater yield than when using other catalysts and therefore the present process will be operated in a more economical and commercially attractive manner. The condensation reaction is effected at conditions which include temperatures ranging from about 100° up to about 400° C. or more and at autogeneous pressures which may range from about atmospheric to about 50 atmospheres or more, the pressure being that which is sufficient to maintain a major portion of the reactants in the liquid phase. Relative amounts of the reactants are expressed in a mole to mole ratio of one reactant to another.

Examples of aromatic amines which may be utilized as a reactant or reactants in the process of this invention include aniline, o-toluidine, m-toluidine, p-toluidine, various isomers of xylidenes, (for example, there are 6 isomeric dimethylanilines) o-ethylaniline, m-ethylaniline, p-ethylaniline, o-propylaniline, m-propylaniline, p-propylaniline, o-isopropylaniline, m-isopropylaniline, p-isopropylaniline, o-butylaniline, m-butylaniline, p-butylaniline, o-isobutylaniline, m-isobutylaniline, p-isobutylaniline, 2,4-dimethylaniline, 2,5-dimethylaniline, 2,6-dimethylaniline, 2,4-diethylaniline, 2,5-diethylaniline, 2,6-diethylaniline, 2,4-dipropylaniline, 2,5 - dipropylaniline, 2,6 - dipropylaniline. The aforementioned compounds are only representative of the class of aromatic amines which may be used and it is contemplated that the present invention is not necessarily limited thereto.

These aromatic amines are condensed with the aromatic compound containing at least one hydroxy substituent and preferably two or more hydroxy substituents such as hydroquinone, resorcinol, pyrocatechol, pyrogallol, phloroglucinol, hydroxyhydroquinone. While the hereinbefore set forth compounds disclose only those aromatic amines and polyhydroxy substituted aromatic compounds containing one aromatic ring, it is contemplated within the scope of this invention that polycyclic aromatic compounds such as 1-amino-naphthalene, 1-amino-2-methylnaphthalene, 1 - amino - 4 - methylnaphthalene, 1,2 - dihydroxynaphthalene, 1,4 - diphydroxynaphthalene, the corresponding anthracenes, phenanthrenes, may also be used although not necessarily with equivalent results.

The catalytic composition of matter which is used to effect the condensation of the aromatic amine and the polyhydroxy substituted aromatic compound will comprise at least one metal oxide composited on a solid support. As hereinafter shown in greater detail in the examples at the end of this specification, the use of such a catalyst will result in the obtention of a greater yield of the desired N,N'-diaryl-p-phenylenediamine. Representative examples of these catalysts will include molybdenum oxide composited on a silica-alumina support, nickel oxide composited on a silica-alumina support, molybdenum oxide and nickel oxide composited on a silica-alumina support, rare earth oxides including cerium oxide, praseodymium oxide, neodymium oxide, promethium oxide, samarium oxide, europium oxide, gadolinium oxide, terbium oxide, dysprosium oxide, holmium oxide, erbium oxide, thulium oxide, ytterbium oxide, lutetium oxide, thorium oxide, protactinium oxide, or mixtures thereof composited on a solid support such as silica-alumina, boria composited on silica-alumina, zirconia composited on silica-alumina.

The process of the present invention may be effected in any suitable manner and may comprise either a batch or continuous type operation. For example, when a batch type operation is used, a quantity of the reactants in a mole to mole ratio are placed in an appropriate apparatus such as, for example, a rotating autoclave along with a catalyst of the type hereinbefore set forth in greater detail. The autoclave is sealed and heated to the desired temperature and allowed to remain thereat for a predetermined residence time ranging from about 1 to about 10 hours or more under autogenous pressures which will develop. If relatively high reaction temperatures are used, it is contemplated that an additional amount of pressure may be required to maintain the reactants in the liquid phase, said pressure being obtained by the introduction of an inert gas such as nitrogen into the reaction vessel. At the end of this time, the reactor and contents thereof are allowed to cool to room temperature, the excess pressure is vented and the reaction mixture is then separated from the catalyst by conventional means such as filtration. If necessary, prior to the filtration, the mixture may be diluted with an appropriate solvent. The resulting mixture is then subjected to treatment to recover the desired products such as fractional distillation, crystallization.

It is also contemplated within the scope of this invention that the process may be effected in a continuous manner of operation. When such a type of operation is used, the starting products comprising at least one aromatic amine and an aromatic compound containing at least one additional substituent are continuously charged to a reaction vessel containing the desired catalyst and which is maintained at the proper operating conditions of temperature and pressure. Upon completion of the desired residence time, the reactor effluent is continuously withdrawn from the reactor and subjected to separation means, the unreacted starting material being recycled to form a portion of the feed stock while the desired reaction products are recovered. When utilizing a continuous type of operation, the make-up of the catalyst employed readily lends itself to a fixed bed type operation in which the catalyst maintained as a bed in the reaction zone while the reactants are passed to said bed in either an upward or downward flow. While this is the preferred manner of operating the process in a continual manner, it is contemplated that a moving bed type of operation in which the catalyst and the reactants will pass through the reaction zone either concurrently or counter-currently to each other be used. Yet another type of continuous type operation which may be used comprises the slurry method in which the catalyst is carried into the reaction zone as a slurry in either or both of the reactants. In addition to the variabilities in which the catalyst may be employed, it is also possible to alter the method of introducing the reactants into the reaction zone. One method is to introduce each reactant through a separate line although it is possible to commingle said reactants prior to entry into said reaction zone and charge the mixture thereto in a single stream.

Examples of N,N' - diaryl - p - phenylenediamines which may be prepared according to the process of this invention include N,N' - diphenyl - p - phenylenediamine, N,N' - di - o - toluyl - p - phenylenediamine, N,N' - di - m - toluyl - p - phenylenediamine, N,N' - di - p - toluyl- p - phenylenediamine, N,N' - dixylyl - p - phenylenediamines of various isomeric structures, N,N' - di - o - ethylphenyl - p - phenylenediamine, N,N' - di - m - ethylphenyl - p - phenylenediamine, N,N' - di - p - ethylphenyl- p - phenylenediamine, N,N' - di - o - propylphenyl - p- phenylenediamine, N,N' - di - p - isopropylphenyl - p- phenylenediamine, N,N' - di - m - propylphenyl - p- phenylenediamine, N - phenyl - N' - o - toluyl - p - phenylenediamine, N - phenyl - N' - m - toluyl - p - phenylenediamine, N - phenyl - N' - p - toluyl - p - phenylenediamine, N - phenyl - N' - p - toluyl - p - phenylenediamine, numerous isomeric structures of N - toluyl - N' - xylyl - p- phenylenediamines, N - phenyl - N' - o - ethylphenyl - p- phenylenediamine, N - phenyl - N' - m - isopropylphenyl- p - phenylenediamine, N - phenyl - N' - p - butylphenyl- p -phenylenediamine, numerous isomers of N - phenyl- N' - xylyl - p - phenylenediamines, various mixtures of the compounds mentioned above. It is to be understood that the aforementioned compounds are only representative of the class of compounds which may be prepared and that the present invention is not necessarily limited thereto.

The following examples are given to illustrate the process of the present invention which, however, are not intended to limit the generally broad scope of the present invention in strict accordance therewith.

EXAMPLE I

In this example, a condensation of hydroquinone with aniline and o-toluidine was effected at a temperature of about 300° C. for 4 hours under autogenous pressure in a sealed rocking autoclave. The catalyst which was used in this experiment comprised about 16% molybdenum oxide and about 2% nickel oxide composited on an alumina-silica base. The desired product which comprised a mixture of N,N' - di - o - toluyl - p - phenylenediamine, N - phenyl - N' - o - toluyl - p - phenylenediamine, and N,N' - diphenyl - p - phenylenediamine was recovered in about 1:2:1 molar ratio. The results of this test are set forth in Table I below.

TABLE I

Charge: Moles
- Aniline _____ 1.0
- Hydroquinone _____ 1.0
- o-Toluidine _____ 1.075
- Temperature—300° C.
- Time—4 hours Product:
- N,N'-di-o-toluyl-p-phenylenediamine _____ 0.08
- N-phenyl-N'-o-toluyl-p-phenylenediamine ___ 0.18
- N,N' - diphenyl - p - phenylenediamine _____ 0.099

Total _____ 0.359

EXAMPLE II

In this example, the experiment of Example I above was performed utilizing a catalyst which comprised a mixture of rare earth oxides composited on an alumina-silica base. The results of this experiment are set forth in Table II below.

TABLE II

Charge: Moles
- Aniline _____ 1.0
- Hydroquinone _____ 1.0
- o-Toluidine _____ 1.075
- Temperature—300° C.
- Time—4 hours

TABLE II—Continued

Product: Moles
- N,N'-di-o-toluyl-p-phenylenediamine _____ 0.070
- N-phenyl-N'-o-toluyl-p-phenylenediamine ___ 0.142
- N,N'-diphenyl-p-phenylenediamine _____ 0.077

Total _____ 0.290

EXAMPLE III

To illustrate the improved yields which are obtained when utilizing a catalyst comprising a metal oxide composited on a solid support, another experiment was performed similar to that set forth in the above examples. However, in this case, the catalyst comprised a silica-alumina catalyst which was calcined so that the water content was approximately 5%, said catalyst containing no additional metal oxides composited thereon. The results of this experiment was set forth in Table III below.

TABLE III

Charge: Moles
- Aniline _____ 1.0
- Hydroquinone _____ 1.0
- o-Toluidine _____ 1.075
- Temperature—300° C.
- Time—4 hours Product:
- N,N'-di-o-toluyl-p-phenylenediamine _____ 0.042
- N-phenyl-N'-o-toluyl-p-phenylenediamine ___ 0.088
- N,N'-diphenyl-p-phenylenediamine _____ 0.046

Total _____ 0.176

As will be noted from a comparison of the desired products which were obtained in the above three experiments it is readily apparent that when utilizing a catalyst comprising at least one metal oxide composited on a solid support there will be obtained an improved yield of the desired product. For example, the amount of desired product obtained in Example I is approximately twice as much as the product obtained in Example III. Likewise, the amount of product obtained in Example II is over 1.5 times greater than that obtained in Example III above.

I claim as my invention:

1. In the process for the preparation of an N,N'-diaryl-p-phenylenediamine by condensing an aromatic amine having the formula ArNH$_2$, wherein Ar is an aromatic hydrocarbon nucleus, with hydroquinone at condensation conditions, the improvement which comprises effecting said condensation in the presence of a catalyst consisting essentially of about 16% molybdenum oxide and about 2% nickel oxide composited on silica-alumina.

2. The process as set forth in claim 1, further characterized in that said condensation conditions include a temperature in the range of from about 100° to about 400° C. and a pressure in the range of from about atmospheric to about 50 atmospheres.

3. The process as set forth in claim 1, further characterized in that said aromatic amine is aniline.

4. The process as set forth in claim 1, further characterized in that said aromatic amine is toluidine.

References Cited
UNITED STATES PATENTS

| | | | |
|---|---|---|---|
| 2,156,793 | 5/1939 | Neal et al. | 260—576 X |
| 2,323,948 | 7/1943 | Bramer et al. | 260—576 X |
| 2,824,137 | 2/1958 | Morris | 260—576 |
| 3,081,348 | 5/1963 | Spacht | 260—576 |

CHARLES B. PARKER, Primary Examiner

C. F. WARREN, Assistant Examiner

U.S. Cl. X.R.

252—454, 458, 459